United States Patent Office 2,817,540
Patented Dec. 24, 1957

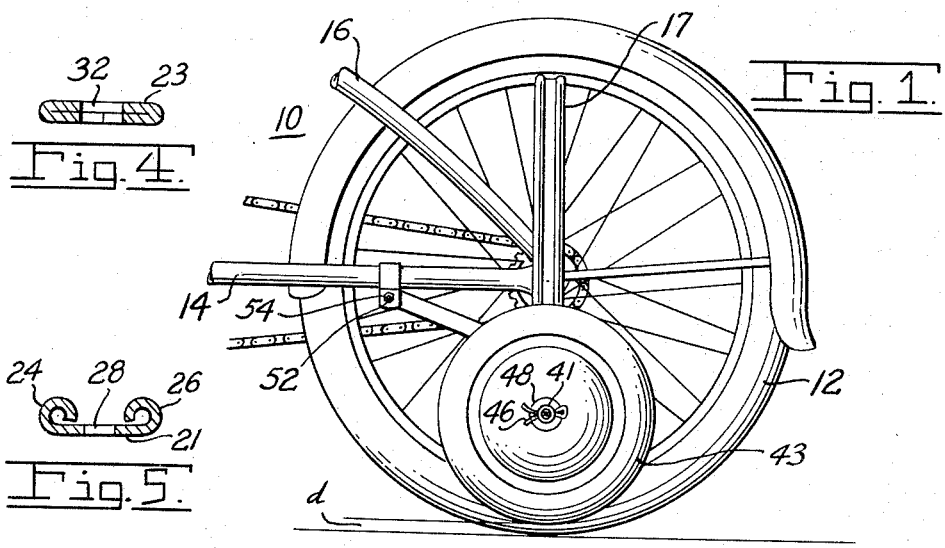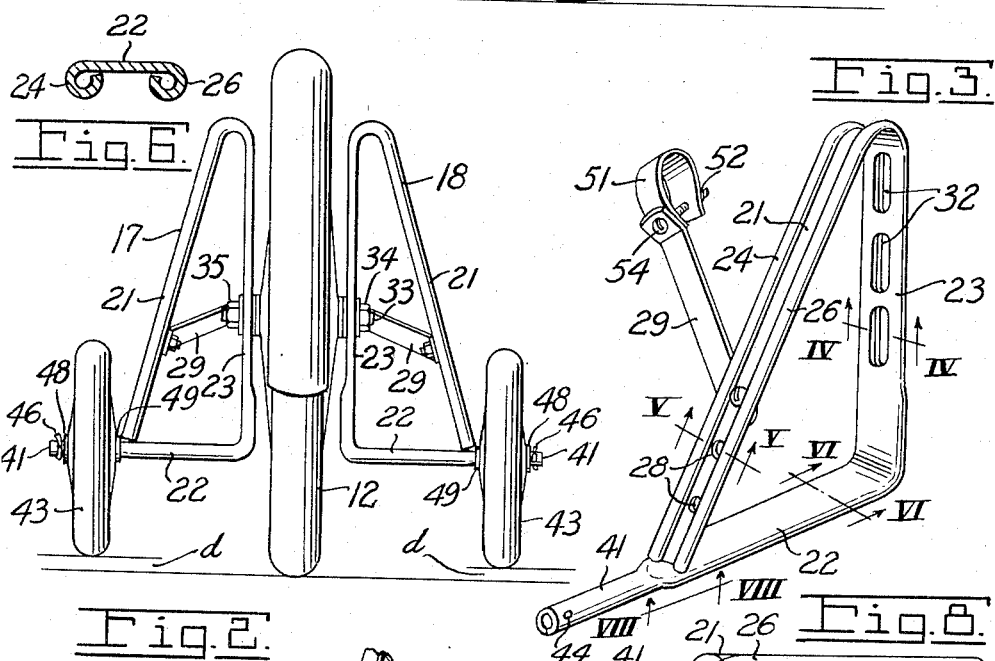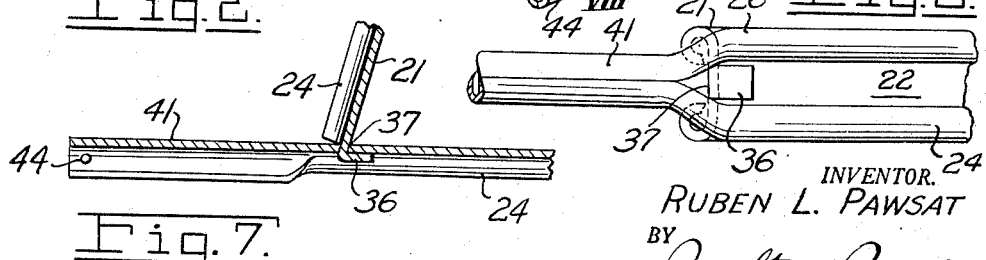

2,817,540

BICYCLE STABILIZER

Ruben L. Pawsat, Maysville, Ky.

Application March 14, 1955, Serial No. 494,063

1 Claim. (Cl. 280—293)

This invention relates to stabilizer frames for a bicycle. More particularly this invention relates to frames for mounting auxiliary or trainer wheels on a bicycle.

An object of this invention is to provide a sturdy, simple, one-piece frame for mounting on one side of the rear wheel of a bicycle in which an axle for an auxiliary wheel is an integral part of the frame.

A further object of this invention is to provide a frame of this type of substantially right triangular shape and so constructed as to form a stirrup or foot rest for an extra or additional passenger.

A further object of this invention is to provide a stabilizer frame which is readily adjustable up and down with respect to the bicycle axle, so that the auxiliary wheel thereof may be placed at any preferred height, and so that the frame may be used with bicycles of various sizes.

A further object of this invention is to provide a frame of substantially right triangular shape composed of a single piece of sheet metal in which a portion of the base thereof projects outwardly from the junction between the hypotenuse and the base in cantilever-fashion, and the outwardly projecting portion is tubular to serve as a wheel axle.

A further object of this invention is to provide a stabilizer frame of this type formed of sheet metal and having rolled reinforced edges in which the frame is of triangular shape and in which a tongue at the lower end of the hypotenuse portion extends through a slot in the base portion adjacent the axle portion, the tongue being bent laterally to secure the hypotenuse portion to the base.

The above and other objects and features of the invention will in part be apparent and will in part be obvious to those skilled in the art to which this invention pertains, from the following detailed description, and the drawing, in which:

Figure 1 is a view in side elevation of the rear portion of a bicycle on which is mounted a set of stabilizer frames constructed in accordance with an embodiment of this invention;

Fig. 2 is a view in rear elevation of the bicycle;

Fig. 3 is a perspective view showing one of the stabilizer frames together with a brace which holds the frame in upright position;

Fig. 4 is a view in section taken on the line IV—IV in Fig. 3;

Fig. 5 is a view in section taken on the line V—V in Fig. 3;

Fig. 6 is a view in section taken on the line VI—VI in Fig. 3;

Fig. 7 is a fragmentary view in lengthwise section of the base portion of the frame and a section of the hypotenuse portion; and Fig. 8 is a fragmentary view in bottom plan of the stabilizer frame looking in the direction of the arrows VIII—VIII of Fig. 3.

In the following detailed description, and the drawing, like reference characters indicate like parts.

In Figs. 1 and 2 is shown the rear portion of a bicycle 10 having a rear wheel 12 and frame members 14 and 16. As shown in Fig. 2, stabilizer frames 17 and 18 are mounted on opposite sides of the wheel 12.

As shown in Fig. 3, each stabilizer frame includes an hypotenuse portion 21, a base portion 22, and an upright leg portion 23. The frame is formed from a single piece or ribbon of sheet metal having rolled edges 24 and 26 on the hypotenuse and base portions, as indicated in Figs. 5 and 6. The rolled edges give strength and rigidity to the frame. The hypotenuse portion of each frame is provided with a plurality of apertures 28 between the rolled edges thereof by means of which a brace 29 is attached to the hypotenuse portion.

The upright leg portion 23 is flattened as indicated in Fig. 4, and is provided with a plurality of slots 32. Each of the slots 32 is adapted to receive the rear axle 33 of the bicycle. As shown in Fig. 2, the stabilizer frames are held in place on the axle by means of axle nuts 34 and 35.

The lower end of the hypotenuse portion is provided with a tongue 36. As shown in Figs. 7 and 8, the tongue 36 projects through a slot 37 in the base portion 22 between rolled edges 24 and 26 thereof. The tongue 36 is bent laterally against the base portion to thereby secure the lower end of the hypotenuse portion to the base portion of the frame.

As shown in Figs. 7 and 8, the base portion of the frame projects cantilever fashion beyond the slot 37 to form a journal or auxiliary axle portion 41. The portion 41 is formed to a tubular shape, as shown most clearly in Fig. 3, and forms an axle for a bicycle stabilizing wheel 43. Perforations 44 are provided in the journal portion for receiving a cotter pin 46 which serves to hold the wheel 43 on the journal portion. Suitable washers 48 and 49 may be placed on axle 41 on opposite sides of the hub of wheel 43.

The frames 17 and 18 are mounted with the axle of the rear bicycle wheel projecting through a selected one of the slots 32 so that rear wheels 43 are supported a selected distance d (see Fig. 2) above the surface on which the bicycle runs. As shown in Figs. 1 and 3, the braces 29 carry U-shaped clamps 51 which are secured to frame members 14 of the bicycle, by means of nuts 52 and bolts 54.

As shown in Fig. 2, the base portions of frames 17 and 18 are substantially horizontal and can be used as stirrups or foot rests by a rider on the back of the bicycle.

The frames may readily be removed from the bicycle axle when not needed and may then be used on another bicycle. The frames are readily adjustable upwardly and downwardly of the bicycle axle so that a single set of frames may be used with bicycles of various sizes.

The bicycle stabilizer frame construction illustrated in the drawing and described above is subject to structural modification without departing from the spirit and scope of the appended claim.

Having described my invention, what I claim as new and desire to secure by Letters Patent is:

A bicycle stabilizer which comprises a one-piece frame comprising a metal strip formed to a generally triangular shape including a substantially upright portion, a substantially horizontal portion integral with the lower end of the upright portion, and a sloping hypotenuse portion, a tongue on the lower end of the hypotenuse portion, there being a slot in the horizontal portion, the tongue being received in the slot and engaging the horizontal portion to hold the frame in triangular shape, the edges of the horizontal portion and the hypotenuse portion having reinforcing rolled edges, a portion of the horizontal portion projecting cantilever fashion outwardly of the slot and being tubular to form a journal for a stabilizing wheel, there being a slot in the upright portion for receiving a bicycle axle, and means for linking the frame to the framework of the bicycle to hold the stabilizer upright.

References Cited in the file of this patent

UNITED STATES PATENTS

| | | |
|---|---|---|
| D. 167,697 | Kosack | Sept. 9, 1952 |
| 1,656,461 | White | Jan. 17, 1928 |
| 1,914,132 | Kenney | June 13, 1933 |
| 2,601,994 | Richman | July 1, 1952 |
| 2,682,418 | Honig | June 29, 1954 |
| 2,712,947 | Pawsat et al. | July 12, 1955 |
| 2,723,133 | Pawsat | Nov. 8, 1955 |
| 2,776,845 | Pearl | Jan. 8, 1957 |